(12) United States Patent
Kim et al.

(10) Patent No.: US 11,109,370 B2
(45) Date of Patent: Aug. 31, 2021

(54) METHOD FOR TRANSMITTING DATA IN NEXT GENERATION COMMUNICATION SYSTEM, AND DEVICE THEREFOR

(71) Applicant: LG ELECTRONICS INC., Seoul (KR)

(72) Inventors: Hyungtae Kim, Seoul (KR); Jiwon Kang, Seoul (KR); Kijun Kim, Seoul (KR); Sukhyon Yoon, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/496,398

(22) PCT Filed: Mar. 21, 2018

(86) PCT No.: PCT/KR2018/003285
§ 371 (c)(1),
(2) Date: Sep. 20, 2019

(87) PCT Pub. No.: WO2018/174555
PCT Pub. Date: Sep. 27, 2018

(65) Prior Publication Data
US 2021/0112538 A1    Apr. 15, 2021

Related U.S. Application Data

(60) Provisional application No. 62/474,536, filed on Mar. 21, 2017, provisional application No. 62/555,654, filed on Sep. 8, 2017.

(51) Int. Cl.
*H04W 72/04* (2009.01)
*H04L 5/00* (2006.01)

(52) U.S. Cl.
CPC ......... *H04W 72/044* (2013.01); *H04L 5/0051* (2013.01); *H04L 5/0082* (2013.01); *H04W 72/042* (2013.01)

(58) Field of Classification Search
CPC ............. H04W 72/044; H04W 72/042; H04L 5/0051; H04L 5/0082
See application file for complete search history.

(56) References Cited

U.S. PATENT DOCUMENTS

2011/0274043 A1    11/2011  Nam et al.
2013/0112994 A1*    5/2013  Sawada ................ H01L 23/049
                                                         257/77

(Continued)

FOREIGN PATENT DOCUMENTS

KR    1020100017051    2/2010
WO      2016018079     2/2016

OTHER PUBLICATIONS

PCT International Application No. PCT/KR2018/003285, Written Opinion of the International Searching Authority dated Jul. 4, 2018, 19 pages.

(Continued)

*Primary Examiner* — Chi Ho A Lee
(74) *Attorney, Agent, or Firm* — Lee Hong Degerman Kang Waimey

(57) ABSTRACT

The present application discloses a method for a terminal to transmit an uplink data signal configured with a plurality of code blocks in a wireless communication system. Particularly, the method comprises: a step of mapping, within one slot, a plurality of code blocks to resource elements by using a time-first method, for each time block; and a step of transmitting, to a base station, an uplink demodulation reference signal and an uplink data signal which is configured with a plurality of code blocks, wherein the size of the time block to which the time-first method is applied is (Continued)

determined based on a mapping pattern of the uplink demodulation reference signal.

11 Claims, 9 Drawing Sheets

(56) References Cited

U.S. PATENT DOCUMENTS

| | | |
|---|---|---|
| 2013/0346827 A1 | 12/2013 | Kim et al. |
| 2016/0112994 A1* | 4/2016 | Wang .................... H04L 5/0094 370/329 |
| 2017/0201989 A1* | 7/2017 | Fakoorian ............. H04L 5/0046 |
| 2017/0223687 A1* | 8/2017 | Kuchibhotla ......... H04L 5/0094 |
| 2018/0070369 A1* | 3/2018 | Papasakellariou .... H04W 16/14 |
| 2018/0131490 A1* | 5/2018 | Patel ................... H04W 72/042 |
| 2018/0167931 A1* | 6/2018 | Papasakellariou .... H04L 5/0053 |
| 2019/0020459 A1* | 1/2019 | Hooli ................... H04L 1/1812 |
| 2019/0190663 A1* | 6/2019 | Sahlin .................. H04L 1/0079 |
| 2019/0229861 A1* | 7/2019 | Yoshimura ............ H04L 1/0043 |
| 2019/0268089 A1* | 8/2019 | Fu ....................... H04W 72/042 |
| 2019/0273587 A1* | 9/2019 | Takeda ................. H04L 5/0064 |

OTHER PUBLICATIONS

LG Electronics, "Discussion on sPUSCH design", 3GPP TSG RAN WG1 Meeting #88, R1-1702429, Feb. 2017, 3 pages.

* cited by examiner

FIG. 2
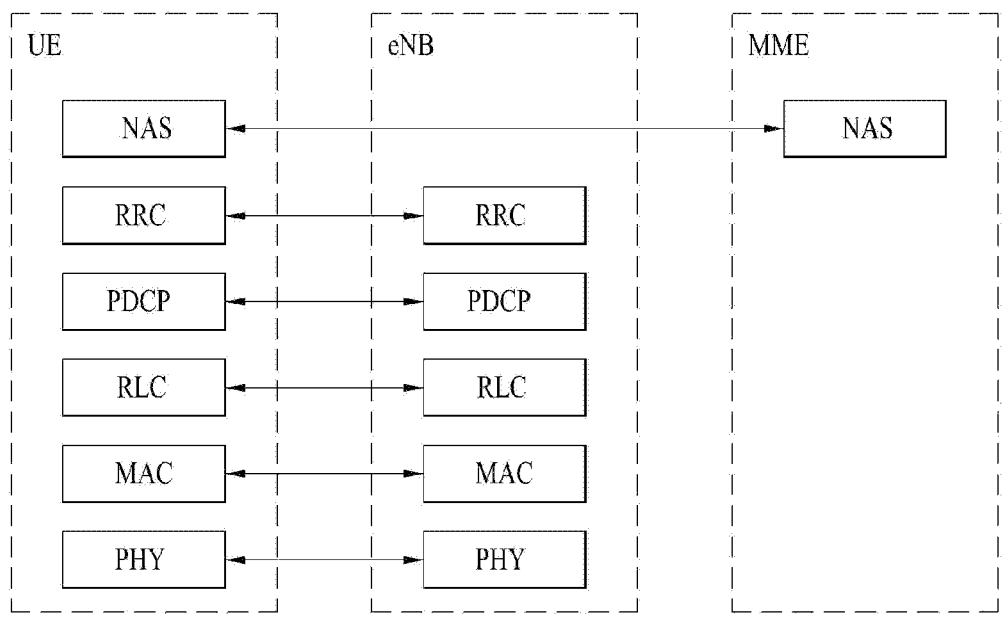
(A) CONTROL-PLANE PROTOCOL STACK
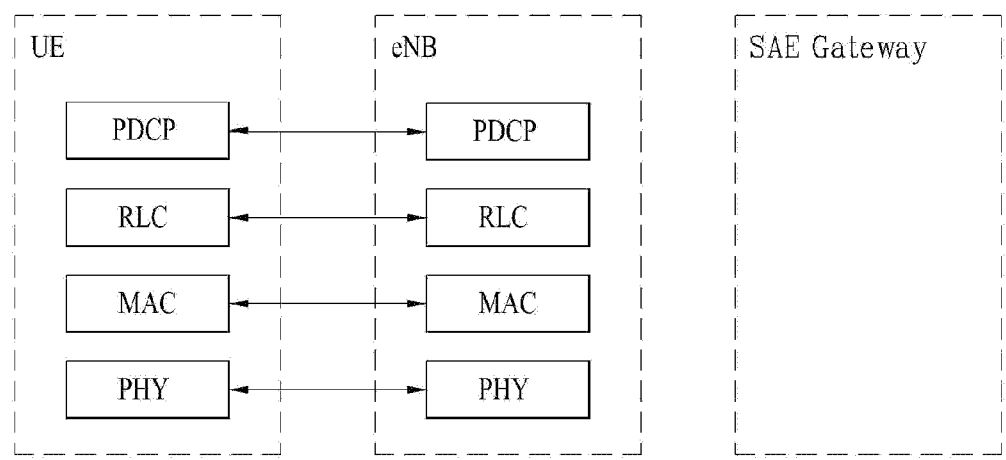
(B) USER-PLANE PROTOCOL STACK

METHOD FOR TRANSMITTING DATA IN NEXT GENERATION COMMUNICATION SYSTEM, AND DEVICE THEREFOR

CROSS-REFERENCE TO RELATED APPLICATIONS

[0] This application is the National Stage filing under 35 U.S.C. 371 of International Application No. PCT/KR2018/003285, filed on Mar. 21, 2018, which claims the benefit of U.S. Provisional Application No. 62/474,536, filed on Mar. 21, 2017, and 62/555,654, filed on Sep. 8, 2017, the contents of which are all hereby incorporated by reference herein in their entireties.

TECHNICAL FIELD

The present disclosure relates to a wireless communication system, and more particularly, to a method and apparatus for transmitting data in a next-generation communication system.

BACKGROUND ART

3GPP LTE (3rd generation partnership project long term evolution hereinafter abbreviated LTE) communication system is schematically explained as an example of a wireless communication system to which the present disclosure is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An aspect of the present disclosure is to provide a method and apparatus for transmitting data in a next-generation communication system, based on the above description.

Technical Solution

In an aspect of the present disclosure, a method of transmitting an uplink data signal including a plurality of code blocks by a user equipment (UE) in a wireless communication system includes mapping a plurality of code blocks to resource elements in a unit of a time block based on a time-first scheme, in one slot, and transmitting an uplink data signal including an uplink demodulation reference signal and the plurality of code blocks to a base station. The size of a time block to which the time-first scheme is applied is determined based on a mapping pattern of the uplink demodulation reference signal.

In an aspect of the present disclosure, a UE in a wireless communication system includes a wireless communication module, and a processor coupled to the wireless communication module and configured to map a plurality of code blocks to resource elements in a unit of a time block based on a time-first scheme, in one slot, and transmit an uplink data signal including an uplink demodulation reference signal and the plurality of code blocks to a base station. The size of a time block to which the time-first scheme is applied is determined based on a mapping pattern of the uplink demodulation reference signal.

When the mapping pattern of the uplink demodulation reference signal is a front slot only allocation pattern, the one slot may be the size of the time block.

When the mapping pattern of the uplink demodulation reference signal is a multi-symbol allocation pattern, the one slot may include a plurality of time blocks. Particularly, each of the plurality of time blocks may include one symbol to which the uplink demodulation reference signal is allocated. For this purpose, the UE may receive information about the number of the plurality of time blocks from the base station.

Advantageous Effects

According to the embodiment of the present disclosure, data may be transmitted by efficiently mapping the data to resource elements (REs) in a next-generation communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification.

BEST MODE FOR CARRYING OUT THE INVENTION

Figure 1:
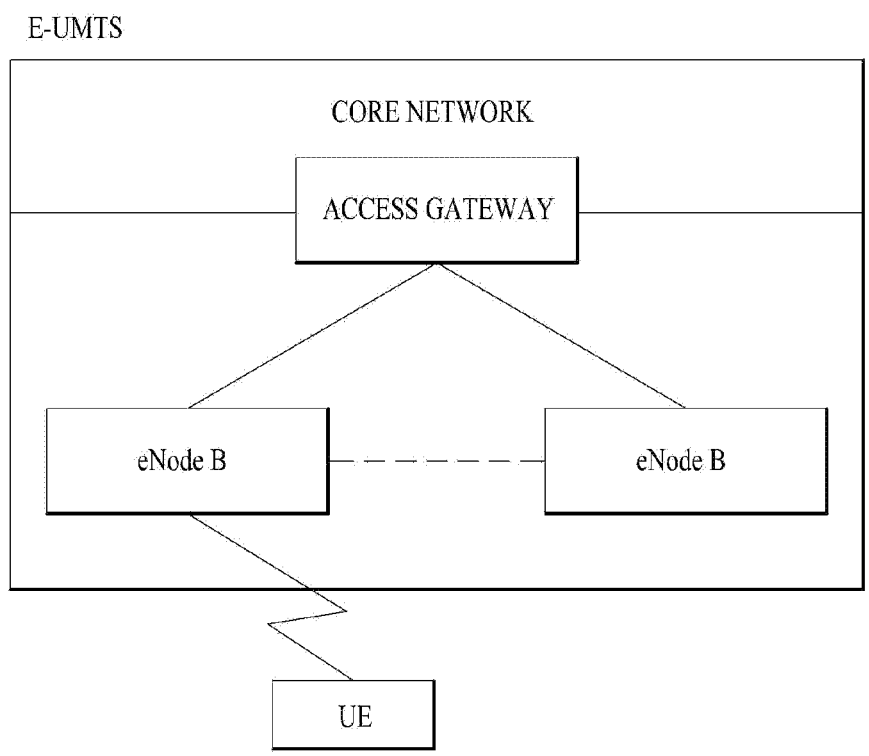
FIG. 1 is a diagram schematically illustrating a network structure of an E-UMTS as an exemplary radio communication system.

The configuration, operation and other features of the present disclosure will be understood by the embodiments of the present disclosure described with reference to the accompanying drawings. The following embodiments are examples of applying the technical features of the present disclosure to a 3rd Generation Partnership Project (3GPP) system.

Although the embodiments of the present disclosure will be described based on an LTE system and an LTE-advanced (LTE-A) system, the LTE system and the LTE-A system are purely exemplary and the embodiments of the present disclosure can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
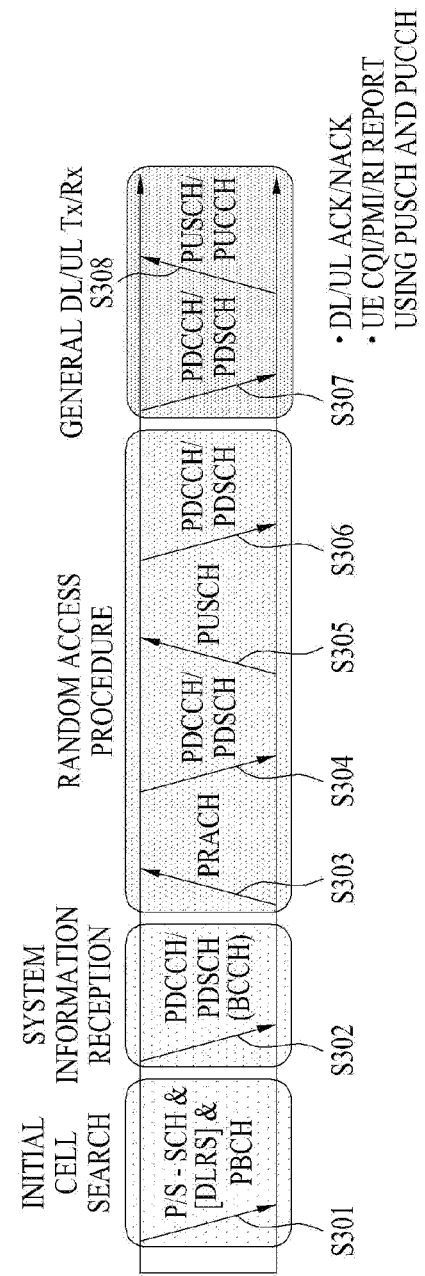
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
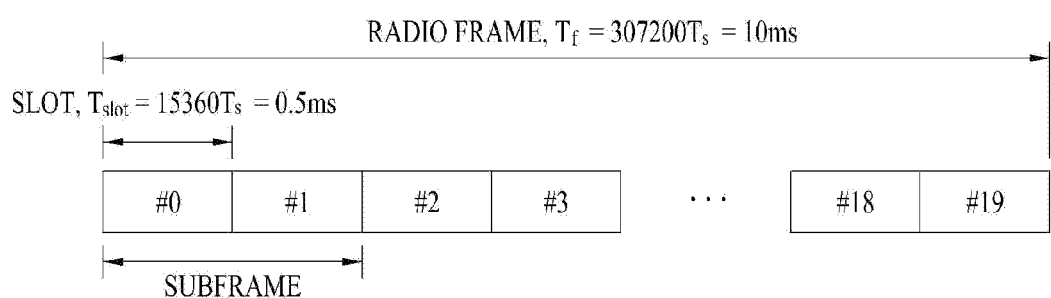
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz×2048) =3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
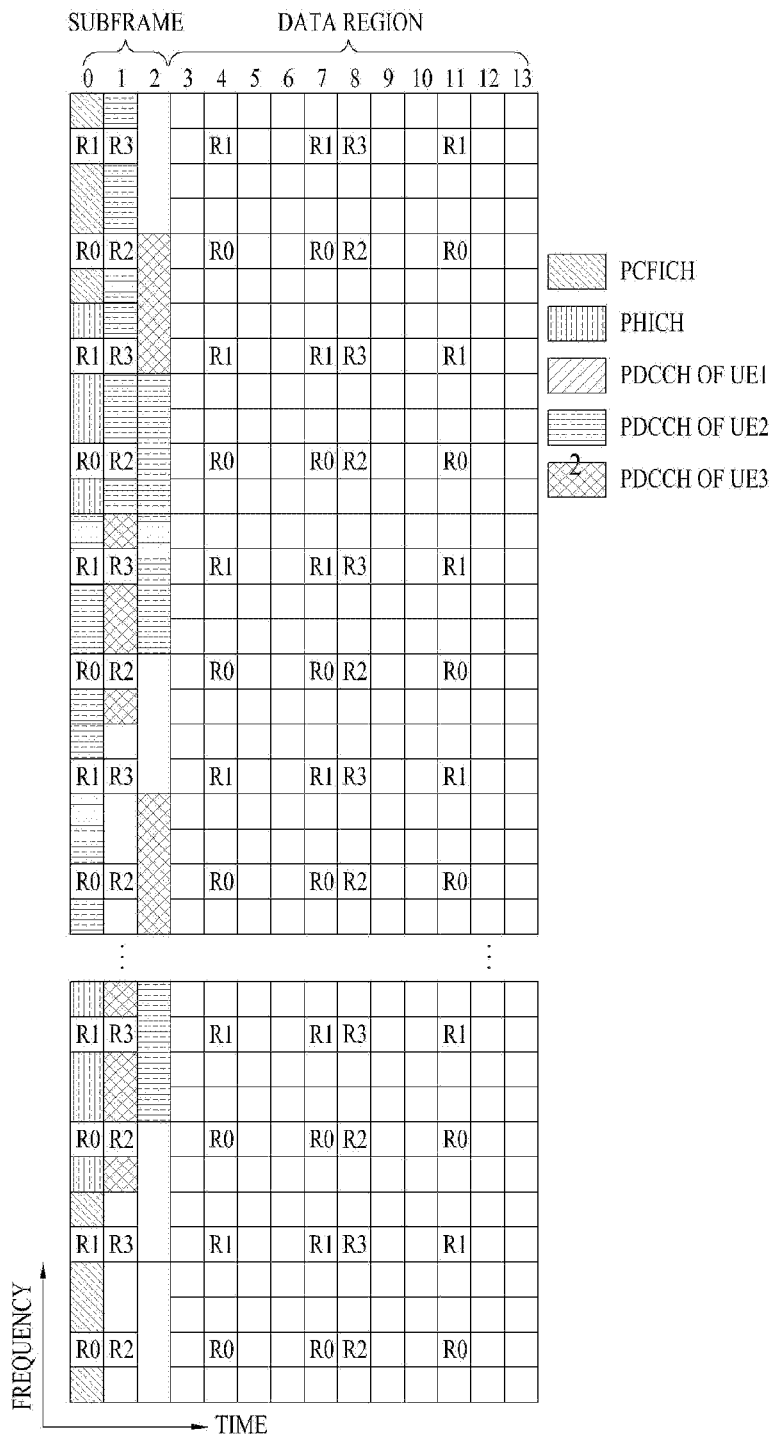
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
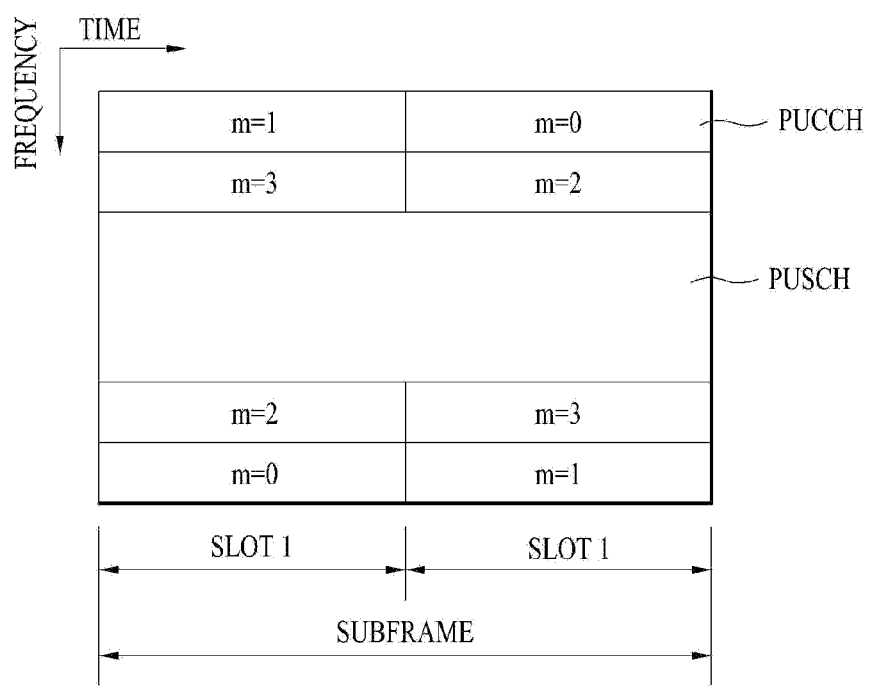
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may perform beamforming based on CSI in order to obtain multiplexing gain of MIMO antennas. To acquire CSI from the UE, the eNB allocates a PUCCH or a PUSCH to the UE and commands the UE to feed back CSI regarding a DL signal.

CSI is divided into three types of information: an RI, a PMI, and a CQI. First, RI is information on a channel rank as described above and indicates the number of streams that may be received by the UE via the same time-frequency resource. Since RI is determined by long-term fading of a channel, RI may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In a 3GPP LTE-A system, the eNB may configure a plurality of CSI processes for the UE and receive report for CSI regarding each CSI process. Herein the CSI process includes a CSI-RS resource for measuring quality of a signal received from the eNB and a CSI-interference measurement (CSI-IM) resource for measuring interference, i.e., an interference measurement resource (IMR).

In a millimeter wave (mmW) band, wavelength is shortened, and thus a plurality of antenna elements may be installed in the same area. Specifically, a total of 64 (=8×8) antenna elements may be installed in a 4-by-4 cm panel in a 30 GHz band with a wavelength of about 1 cm in a 2-dimensional array at intervals of $0.5\lambda$ (wavelength). Therefore, in mmW, increasing coverage or throughput by increasing beamforming (BF) gain using multiple antenna elements has recently been taken into consideration.

If a transceiver unit (TXRU) is provided for each antenna element to enable adjustment of transmit power and phase, independent BF is possible for each frequency resource. However, installing TXRU in all of the about 100 antenna elements is less feasible in terms of cost. Therefore, a method of mapping multiple antenna elements to one TXRU and adjusting the direction of a beam using an analog phase shifter is under consideration. This analog BF method may make only one beam direction in the whole band, and thus may not perform frequency selective BF, which is disadvantageous.

Hybrid BF using B TXRUs less in number than Q antenna elements may be considered as an intermediate type of digital BF and analog BF. In this case, the number of beam directions in which beams may be transmitted at the same time is limited to B or less, which depends on a connection method of B TXRUs and Q antenna elements.

Figure 7:
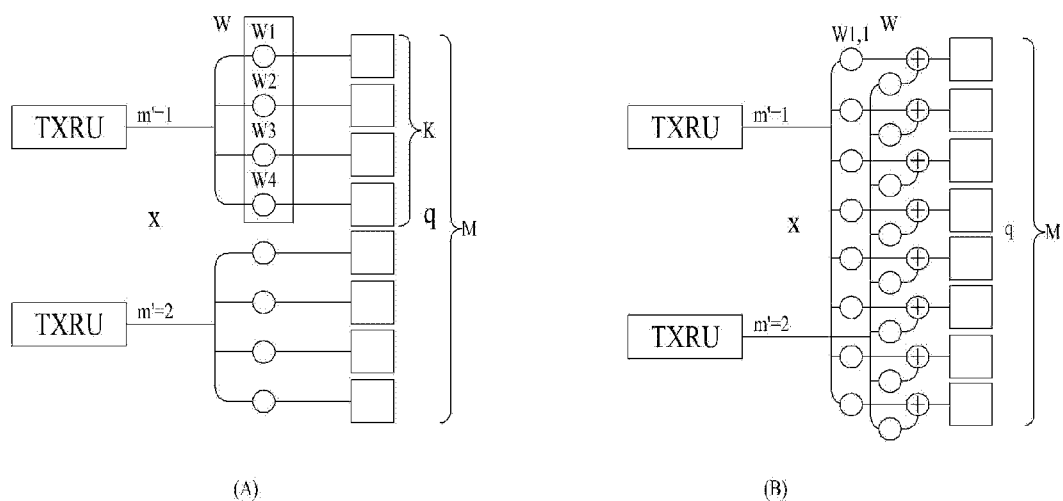
FIG. 7 illustrates exemplary connection schemes between TXRUs and antenna elements.

FIG. 7 illustrates exemplary connection schemes between TXRUs and antenna elements.

(a) of FIG. 7 illustrates connection between a TXRU and a sub-array. In this case, an antenna element is connected only to one TXRU. In contrast, (b) of FIG. 7 illustrates connection between a TXRU and all antenna elements. In this case, an antenna element is connected to all TXRUs. In FIG. 7, W represents a phase vector subjected to multiplication in an analog phase shifter. That is, a direction of analog BF is determined by W. Herein, CSI-RS antenna ports may be mapped to TXRUs in a one-to-one or one-to-many correspondence.

As more communication devices have demanded higher communication capacity, there has been necessity of enhanced radio broadband communication relative to legacy radio access technology (RAT). In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In the present disclosure, the above technology is referred to as NewRAT for convenience of description.

Figure 8:
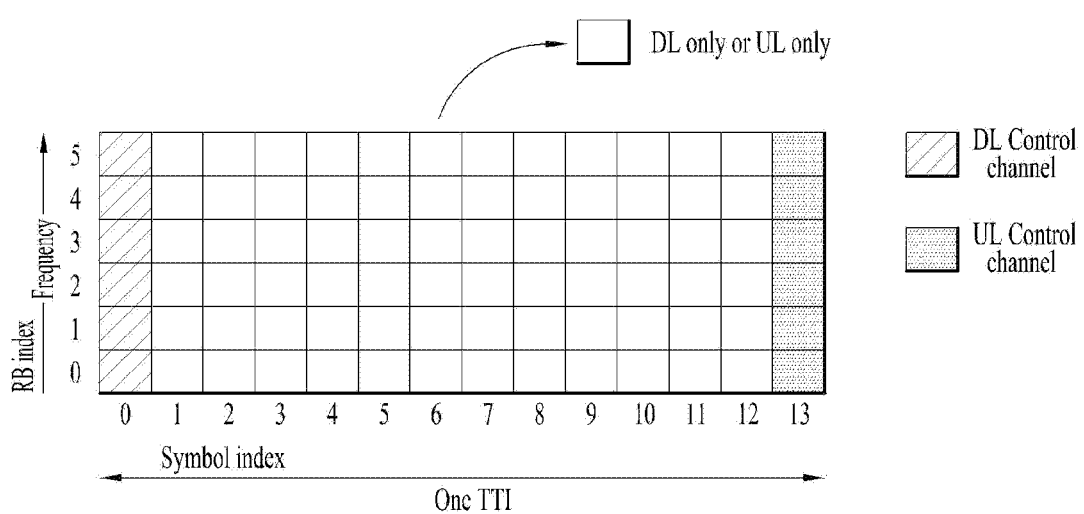
FIG. 8 illustrates the structure of an exemplary self-contained subframe.

To minimize data transmission latency in a time division duplex (TDD) system, the structure of a self-contained subframe as illustrated in FIG. 8 is considered in fifth-generation (5G) NewRAT. FIG. 8 illustrates the structure of an exemplary self-contained subframe.

In FIG. 8, the hatched area represents a DL control region and the black area represents a UL control region. The area having no marks may be used for either DL data transmission or UL data transmission. In this structure, DL transmission and UL transmission may be sequentially performed in one subframe to send DL data and receive UL ACK/NACK therefor in a subframe. As a result, this structure may reduce time taken to retransmit data when a data transmission error occurs, thereby minimizing the latency of final data transmission.

In such a self-contained subframe structure, a time gap is required in order for the eNB and the UE to switch from a transmission mode to a reception mode or from the reception mode to the transmission mode. To this end, some OFDM symbols at the time of switching from DL to UL in the subframe structure may be set as a guard period (GP).

Examples of the self-contained subframe type that may be configured/set in the system operating based on NewRAT may consider at least four subframe types as follows.

DL control period+DL data period+GP+UL control period
DL control period+DL data period
DL control period+GP+UL data period+UL control period
DL control period+GP+UL data period According to the current LTE standards, UL data is first mapped to a spatial domain, that is, a layer, to a time domain, that is, an OFDM symbol, and then to a frequency domain, that is, an OFDM subcarrier.

The layer mapping order is determined as described above for the reason that mapping starting from a domain experiencing a great change in channel quality is efficient for an HARQ operation. That is, when multiple code blocks (CBs) are transmitted, each CB being not similar in channel quality (i.e., the CBs are greatly heterogeneous), the probability of NACK is increased due to a CB having the lowest channel quality. On an LTE UL, for example, all of multiple CBs (e.g., CB 1 and CB 2) of the same codeword (CW) experience the same layer, and are first mapped on the time axis, so that the two CBs experience fading in the time domain within one subframe. Although the two CBs undergo different frequency selective channels due to final mapping in the frequency domain, the influence of frequency selectivity is small because an LTE UL signal has an SC-OFDM waveform. Therefore, the two CBs experience similar channel qualities, thereby decreasing the probability of decoding failure of at least one CB and hence the probability of NACK.

In the NR system, UL supports two waveforms, SC-OFDM (or DFT-s-OFDM) and CP-OFDM, for rank 1 transmission. As in the LTE system, therefore, RE mapping is performed preferably in the order of layer, time, and frequency in SC-OFDM, whereas RE mapping is performed preferably in the order of layer, frequency, and time in CP-OFDM. In CP-OFDM, because frequency selectivity is generally larger than fading variation in the time domain, it is preferable to map data to REs in the above order.

Preferably, the eNB may indicate a mapping order for UL between the two mapping orders to the UE. Alternatively, in conjunction with configured waveforms, RE mapping is performed in the order of layer, time, and frequency in SC-OFDM like the LTE UL, and in the order of layer, frequency, and time in CP-OFDM like the LTE DL.

A DM-RS pattern-based RE mapping scheme proposed by the present disclosure will be described. Particularly, a different method of mapping data to REs according to the present disclosure may be used according to the positions of REs to which DM-RSs are mapped, that is, a DM-RS pattern.

<Case 1—Front Loaded DM-RS Only>

A UL DM-RS pattern preferably affects an RE mapping order. In the current NR system, the DM-RS may be transmitted only in an earlier OFDM symbol of a slot. This is called a front slot only allocation (front loaded DM-RS only) structure. In this case, if data is mapped in the order of layer, frequency, and time, a leading CB is transmitted at a position close to the DM-RS, but a trailing CB is transmitted at a position far from the DM-RS. The resulting inaccurate channel estimation of the trailing CB increases the probability of decoding failure and hence the probability of NACK. Therefore, mapping in the order of layer, time, and frequency is valid in this case.

<Case 2—Front Loaded DM-RS+Additional DM-RS>

It may be considered to transmit the DM-RS in an earlier OFDM symbol and additionally in a later OFDM symbol in a slot. That is, an additional DM-RS is transmitted in the front loaded DM-RS only structure. This is called a multi-symbol allocation structure. This structure is suitable for an environment with greatly time-varying channels, or for a case in which it is difficult to estimate a time-varying channel phase due to phase noise.

In this case, even though CBs are mapped in the order of layer, frequency, and time, both of the leading and trailing CBS have increased channel estimation accuracy. Accordingly, this mapping order may be preferable. However, since the channel estimation performance is still different between the CB far from the DM-RS and the CBs close to the DM-RS, the NACK probability of a specific CB may be increased. If the DM-RS is densely transmitted on the time axis, the NACK probability decreases despite the mapping order of layer, frequency, and time. Therefore, the order of layer, frequency, and time is preferable.

<Case 3-Slot Bundling>

Similarly, even when DM-RS time bundling between slots is applied to a mini-slot, CBs may be mapped in the order of layer, frequency, and time because multiple DM-RS OFDM symbols exist on the time axis. That is, in the environment where the DM-RS pattern is densely spread on the time axis, even if the CBs are mapped to frequency before time, the channel estimation performance between the CBs is similar. Therefore, the CBs may be mapped first along the frequency axis. In contrast, in an environment where the DM-RS pattern is not spread along the time axis, it is preferable to map the CBs along the time axis before along the frequency axis.

In another method of the present disclosure, time-first mapping is performed, wherein with time blocks introduced, time-first mapping is performed within a time block, and if all RES of the time block are mapped, time-first mapping may be performed again in the next time block.

For example, the DM-RS is transmitted in one or two starting OFDM symbols in case 1 described above, all slots are set as a time block and data is mapped to REs in the same manner as legacy time-first mapping. In case 2, since the DM-RS is transmitted in leading and trailing OFDM symbols, two or more time blocks are defined and time-first mapping is performed. Time block 1 and time block 2 include a front-loaded DM-RS and a rear-loaded DM-RS, respectively. More specifically, time block 1 is REs of up to a symbol before a trailing DM-RS OFDM symbol begins, and time block 2 begins in a symbol in which the trailing DM-RS OFDM symbol begins.

Further, in case 3, that is, slot bundling, since DM-RSs to which the same precoder is applied are transmitted densely on the time axis, it is preferable to set a time block to a small size. For example, when slot bundling between a plurality of mini-slots is applied, one time block may be set as one mini-slot. As a result, if mini-slot 1 to mini-slot 4 are bundled, time block 1 to time block 4 are set.

If the DM-RS is transmitted only in some slots, not in every slot, to reduce a DM-RS density during slot bundling between mini-slots, mini-slots and time blocks are not mapped in a one-to-one correspondence. Instead, a plurality of mini-slot may form one time block.

The number N of symbols included in a time block may be indicated by RRC signaling or DCI from the eNB. Alternatively, the UE may feed back a desired N value to the eNB.

Like the introduction of a time block in the above-described time-first mapping, a frequency block may be applied, with a modification to the time block, in frequency-first mapping.

Considering the above embodiments in combination, although the mapping order of layer, frequency, and time is suitable in UL CP-OFDM, the order between frequency and time may be changed according to a DM-RS pattern. For example, when the DM-RS pattern is front loaded DM-RS only as in case 1, it is preferable to map data in a time-first manner in consideration of channel estimation performance. If the DM-RS pattern is front loaded DM-RS+additional DM-RS as in case 2 or is based on slot bundling as in case 3, it is preferable to map data in a frequency-first manner according to time-varying channel estimation performance.

Further, although the mapping order of layer, time, and frequency is suitable in UL SC-OFDM, the order between frequency and time may be changed according to a DM-RS pattern. For example, when the DM-RS pattern is front loaded DM-RS only, it is preferable to map data in a time-first manner in consideration of channel estimation performance. If the DM-RS pattern is front loaded DM-RS+ additional DM-RS or is based on slot bundling, it is preferable to map data in a frequency-first manner according to time-varying channel estimation performance.

In the recent discussion for standardization, techniques for obtaining a diversity gain by changing an effective channel carrying data in the frequency domain (RE/RB/PRG level, etc.) during open-loop MIMO transmission are discussed. Then, frequency-first mapping or time-first mapping may be determined according to a resource unit in which an effective channel is changed in the frequency domain. For example, when the effective channel is changed at the level of a small resource unit, that is, at an RE level, it is preferable to apply frequency-first mapping so that each CB experiences sufficient frequency selectivity. If the effective channel is changed at the level of a large resource unit, that is, at a PRG level, it is preferable to map CBS in the time-first manner so that each CB experiences fading in a sufficient time domain. Alternatively, if the size of a scheduled RB is equal to or greater than a predetermined value, it is preferable to map CBs in the frequency-first manner so that each CB experiences sufficient frequency selectivity. Otherwise, time-first mapping is preferably performed so that each CB experiences fading in a sufficient time domain. It is also possible to perform the proposals in combination in consideration of both the resource unit in which the effective channel of the frequency domain changes and the number of scheduled RBs.

Alternatively, RE mapping may be performed differently depending on closed-loop MIMO or open-loop MIMO. For example, if the effective channel is designed to change at an RE level in open-loop MIMO, and in units of a PRG in closed-loop MIMO, frequency-first mapping is performed in open-loop MIMO and time-first mapping is performed in closed-loop MIMO. While an open-loop MIMO scheme that changes an effective channel in the frequency domain has been described for the convenience of description, the proposed technique for the time domain instead of the frequency domain may be used in the case of an open-loop MIMO scheme that changes an effective channel (at a symbol level or slot level) in the time domain.

Further, various RE mapping methods are under consideration for UL PDSCH transmission in DFT-S-OFDM. In frequency-first mapping, for example, each CB is transmitted in a different OFDM symbol, and thus CB encoding and decoding may be performed sequentially, not at one time, thereby reducing implementation complexity. However, a frequency diversity gain may not be acquired due to frequency hopping along the frequency axis, and time-axis diversity is also limited. In contrast, in time-first mapping, all CBs are transmitted in the same OFDM symbol, which means that CB encoding and decoding should be performed at one time. Therefore, implementation complexity increased. However, a frequency diversity gain may be acquired from frequency hopping along the frequency axis, and a maximum time-axis diversity gain may be obtained. The eNB may determine an optimum mapping scheme according to a communication environment and indicate the determined optimum mapping scheme to the UE by higher-layer signaling.

If a PDSCH includes a small number of CBs, the above schemes have little difference in performance. For example, when a PDSCH includes one CB, the above RE mapping schemes are identical in performance. Accordingly, a method of changing an RE mapping scheme according to the number of CBs may be considered. Because the number of CBs is determined according to the number of allocated RBs and an MCS, frequency-first mapping may be used for a small number of CBs, and time-first mapping may be used for a large number of CBs.

Figure 9:
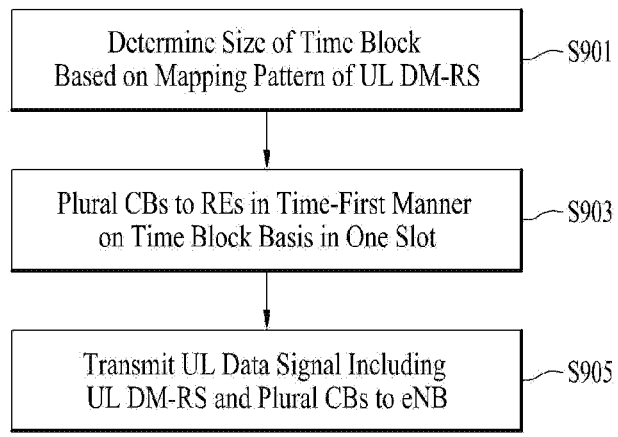
FIG. 9 is a flowchart illustrating a method of mapping a plurality of code blocks to resource elements according to an embodiment of the present disclosure.

FIG. 9 is a flowchart illustrating a method of mapping a plurality of CBs to REs according to an embodiment of the present disclosure. Particularly, FIG. 9 illustrates time-first mapping, wherein with time blocks introduced, time-first mapping is performed in a time block, and when all REs of the time block are mapped, time-first mapping is performed again in the next time block.

Referring to FIG. 9, a UE determines the size of a time block to which time-first mapping is applied, based on a UL DM-RS mapping pattern in step 901.

The UE maps a plurality of CBs to REs in the time-first manner on a time block basis in a slot in step 903, and transmits a UL data signal including a UL DM-RS and the plurality of CBs to an eNB in step 905.

Specifically, if the UL DM-RS mapping pattern is a multi-symbol allocation pattern, the one slot includes a plurality of time blocks. Particularly, each of the plurality of time blocks includes one symbol to which the Ul DM-RS is allocated. Further, if the UL DM-RS mapping pattern is front-loaded DM-RS only, the one slot is determined to be the size of the time block. Further, the UE may receive information about the number of the plurality of time blocks from the eNB.

Figure 10:
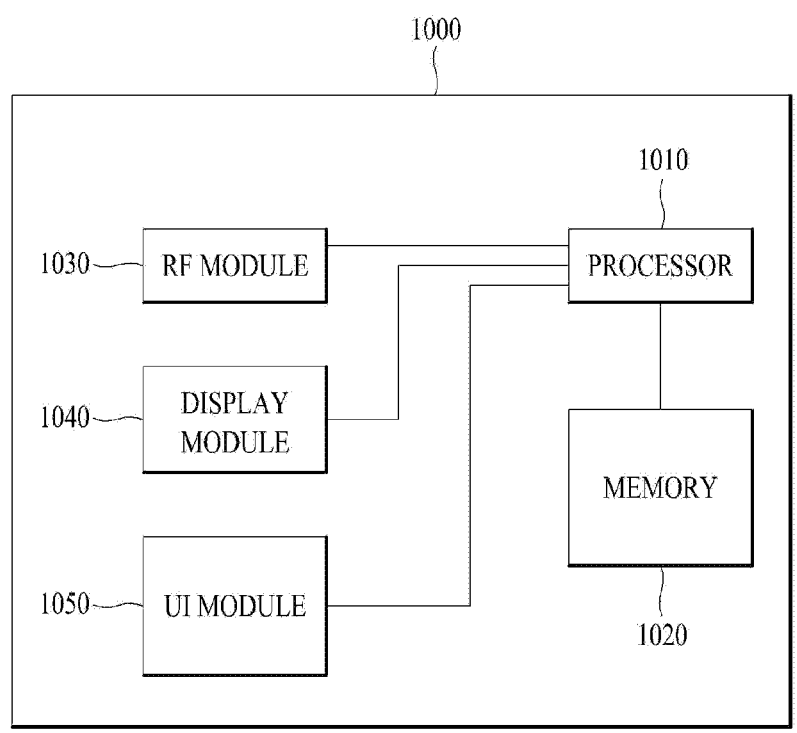
FIG. 10 is a block diagram illustrating a communication device according to an embodiment of the present disclosure.

FIG. 10 is a block diagram illustrating a communication device according to an embodiment of the present disclosure.

Referring to FIG. 10, a communication device 1000 may include a processor 1010, a memory 1020, a Radio Frequency (RF) module 1030, a display module 1040, and a user interface module 1050.

Since the communication device 1000 is illustrated for convenience of description, some of the modules may be omitted. If necessary, other modules may be further included in the communication device 1000. In some cases, some modules may be divided into sub-modules. The processor 1010 may be configured to perform the operations in accordance with the embodiments of the present invention, which are illustrated with the accompanying drawings. The operations of the processor 1010 are described in detail above with reference to FIGS. 1 to 9.

The memory 1020 is connected to the processor 1010 and stores operating systems, applications, program codes, data, etc. The RF module 1030 is connected to the processor 1010 and converts a baseband signal into a radio signal or vice versa. To this end, the RF module 1030 performs analog conversion, amplification, filtering, and frequency up-conversion, or inverse procedures thereof. The display module 1040 is connected to the processor 1610 and displays various information. The display module 1040 may be implemented using well-known elements such as a Liquid Crystal Display (LCD), a Light Emitting Diode (LED), and an Organic Light Emitting Diode (OLED). However, it is not limited thereto. The user interface module 1050 is connected to the processor 1010 and may be implemented by combining well-known user interfaces such as a keypad, a touchscreen, etc.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made therein without departing from the spirit and scope of the invention. Therefore, the detailed description should not be interpreted restrictively in all aspects but considered as exemplary. Thus, it is intended that the present invention covers the modifications and variations of this invention that come within the scope of the appended claims and their equivalents.

The invention claimed is:

1. A method of transmitting an uplink data signal including a plurality of code blocks by a user equipment (UE) in a wireless communication system, the method comprising:
   mapping a plurality of code blocks to resource elements in a unit of a time block based on a time-first scheme, in one slot; and
   transmitting an uplink data signal including an uplink demodulation reference signal and the plurality of code blocks to a base station,
   wherein the one slot includes at least one time block, and
   wherein a number of the at least one time block included in the one slot is applied is determined based on a mapping pattern of the uplink demodulation reference signal.

2. The method according to claim 1, wherein when the mapping pattern of the uplink demodulation reference signal is a front slot only allocation pattern, the one slot includes only one time block.

3. The method according to claim 1, wherein when the mapping pattern of the uplink demodulation reference signal is a multi-symbol allocation pattern, the one slot includes a plurality of time blocks.

4. The method according to claim 3, wherein each of the plurality of time blocks includes one symbol to which the uplink demodulation reference signal is allocated.

5. The method according to claim 3, further comprising receiving information about a number of the plurality of time blocks from the base station.

6. A user equipment (UE) in a wireless communication system, the UE comprising:
   a wireless communication module; and
   at least one processor coupled to the wireless communication module and configured to map a plurality of code blocks to resource elements in a unit of a time block based on a time-first scheme, in one slot, and transmit an uplink data signal including an uplink demodulation reference signal and the plurality of code blocks to a base station,
   wherein the one slot includes at least one time block, and
   wherein a number of the at least one time block included in the one slot is applied is determined based on a mapping pattern of the uplink demodulation reference signal.

7. The UE according to claim 6, wherein when the mapping pattern of the uplink demodulation reference signal is a front slot only allocation pattern, the one slot includes only one time block.

8. The UE according to claim 6, wherein when the mapping pattern of the uplink demodulation reference signal is a multi-symbol allocation pattern, the one slot includes a plurality of time blocks.

9. The UE according to claim 8, wherein each of the plurality of time blocks includes one symbol to which the uplink demodulation reference signal is allocated.

10. The UE according to claim 8, wherein the at least one processor is configured to receive information about a number of the plurality of time blocks from the base station.

11. The UE according to claim 6, wherein the UE is capable of communicating with at least one of another UE, a UE related to an autonomous driving vehicle, the BS or a network.

* * * * *